United States Patent
Johansson et al.

(10) Patent No.: US 10,112,834 B2
(45) Date of Patent: Oct. 30, 2018

(54) SYNTHESIS OF AMMONIUM DINITRAMIDE, ADN

(71) Applicant: Totalforsvarets forskningsinstitut, Stockholm (SE)

(72) Inventors: Jonas Johansson, Arsta (SE); Nikolaj Latypov, Molkom (SE); Stefan Ek, Stockholm (SE); Martin Skarstind, Svartsjo (SE); Henrik Skifs, Karlskoga (SE)

(73) Assignee: TOTALFOERSVARETS FORSKNINGSINSTITUT, Stockholm (SE)

( * ) Notice: Subject to any disclaimer, the term of this patent is extended or adjusted under 35 U.S.C. 154(b) by 0 days.

(21) Appl. No.: 15/115,743

(22) PCT Filed: Jan. 29, 2015

(86) PCT No.: PCT/SE2015/000004
§ 371 (c)(1),
(2) Date: Aug. 1, 2016

(87) PCT Pub. No.: WO2015/115962
PCT Pub. Date: Aug. 6, 2015

(65) Prior Publication Data
US 2017/0008768 A1    Jan. 12, 2017

(30) Foreign Application Priority Data
Jan. 30, 2014   (SE) ...................................... 1400043

(51) Int. Cl.
| | | |
|---|---|---|
| *C01B 21/087* | (2006.01) | |
| *B01D 15/20* | (2006.01) | |
| *B01D 15/22* | (2006.01) | |
| *B01J 20/20* | (2006.01) | |

(52) U.S. Cl.
CPC ............ *C01B 21/087* (2013.01); *B01D 15/20* (2013.01); *B01D 15/22* (2013.01); *B01J 20/20* (2013.01); *B01J 2220/52* (2013.01)

(58) Field of Classification Search
CPC ..................................................... C01B 21/087
See application file for complete search history.

(56) References Cited

U.S. PATENT DOCUMENTS

| | | | | |
|---|---|---|---|---|
| 5,316,749 A | * | 5/1994 | Schmitt | ................. C01B 21/082 423/385 |
| 5,976,483 A | * | 11/1999 | Langlet | ................. C01B 21/082 423/385 |
| 7,981,393 B2 | | 7/2011 | Voerde | |

FOREIGN PATENT DOCUMENTS

| | | |
|---|---|---|
| EP | 0843647 | 5/1998 |
| WO | WO 97/06099 | 2/1997 |

OTHER PUBLICATIONS

Talawar et al. Environmentally compatible next generation green energetic materials (GEMs) Journal of Hazardous Materials 161 (2009) 589-607.

* cited by examiner

*Primary Examiner* — Stuart L Hendrickson
(74) *Attorney, Agent, or Firm* — Jacobson Holman, PLLC.

(57) ABSTRACT

The invention concerns a method for making ADN from GUDN in one single process step. GUDN is reacted with an ammonium source (ammonium-sulfamate, ammonium-sulfate, ammonia) and an ion-change gives ADN from GUDN in one process stage. The advantages are that the process gives pure ADN without potassium contaminants and that a smaller amount of solvent is necessary.

17 Claims, No Drawings

SYNTHESIS OF AMMONIUM DINITRAMIDE, ADN

THE PRESENT STATE OF TECHNOLOGY AND PROBLEMS WITH THE CURRENT PRODUCTION OF ADN

Currently, ammonium dinitramide (ADN) is produced by reacting guanylurea-dinitramide in a solution of alcohol and water with potassium-hydroxide which yields potassium-dinitramide (PDN). The process is described in U.S. Pat. No. 7,981,393. In a second process stage KDN is reacted with ammonium-sulfate in a water solution which yields ADN. The second process stage is described in EP0843647. A problem with this production is that the process includes potassium. The potassium will be left in the final product, ADN, which is a problem. It is difficult and expensive to remove the potassium from the ADN. Potassium presents an increased signature when combusting solid rocket fuels and in liquid fuels it creates problems with catalyst poisoning. Another problem with the current production process is that the process involves two process steps. Additional process steps create a more expensive and more time consuming process. A further problem with using the current process is that it demands the use of a large amount of solvent.

Solvents have to be taken care of, and possess an environmental burden which preferably should be avoided. The current process is hence expensive, time consuming, environmentally burdening and yields ADN that can be polluted by potassium.

THE INVENTION AND ADVANTAGES WITH THE INVENTION

The invention comprises a process by which ADN can be produced using GUDN. GUDN is reacted with an ammonium source, for example ammonium-sulfate, ammonium-sulfamate or ammonia, where an ion-change forms ADN from GUDN in a single process stage. The advantages are that the process involves only one process stage and that a smaller amount of solvent is needed. Hence, the process is simpler and more environmentally friendly than previously known processes. Furthermore, the process does not involve potassium and, thus, does not give any potassium residues in produced ADN.

CLOSER DESCRIPTION OF THE INVENTION

The invention is comprises reacting GUDN with an ammonium source whereby ADN is formed through an ion-exchange reaction.

In the first of four described methods GUDN is heated together with an ammonium source, for example ammonium-sulfate or ammonium-sulfamate in a water solution until the solution is homogenous. Thereafter the heat source is removed and alcohol, for instance methanol, ethanol, propanols, butanols or similar is added when guanylurea-sulfate (when using ammonium-sulfate) or guanylurea-sulfamate (using ammonium-sulfamate) precipitates from the solution and is filtered off. A filtrate is achieved that, among other things contains ADN and un-reacted GUDN. The filtrate is concentrated and the residue from this stage is suspended in one of the above mentioned alcohols, and ADN is dissolved in it. GUDN remains undissolved and is discarded through filtration. The filtrate is concentrated to dryness which yields pure ADN.

In a second described method ammonia is used as a source of ammonium. A solution of ammonia and GUDN is made. Then an ion-exchange takes place at which ADN and guanylurea is formed in the solution. The solution is passed through a column with active carbon which has been pre-treated with diluted ammonia. Guanylurea then remained in the column and ADN leaves the column together with the solvent. Evaporation of this, so called, eluted solution yields pure ADN.

In a third described method GUDN and ammonium-sulfate are mixed in an alcohol, for example methanol, ethanol, propanols and butanols or similar. A mixture of alcohol, GUDN and ammonium-sulfate is backflow-boiled to achieve an ion-exchange. Thereafter the mix is left to cool and a precipitate is formed. The precipitate is filtered off and a filtrate is achieved. In the filtrate there is, among other things, ADN and un-reacted GUDN. The filtrate is concentrated to dryness and the remains from this stage is suspended in one of the above mentioned alcohols, at which time ADN is dissolved. GUDN remains un-dissolved and is removed through filtration. The filtrate which is achieved is concentrated to dryness yielding pure ADN.

In a fourth described method GUDN is mixed with ammonium-sulfate in a solution of water and alcohol. Alcohols that can be used are, for example, propanols, pentanols or similar so that a two-phase system is achieved. The mixture is heated until a homogenous solution is achieved. Thereafter the heat is removed and the phases separate again. The organic phase is taken aside. The water phase is extracted using one of the above mentioned alcohols. After separation the organic phase from this extraction is mixed with the organic phase from the previous step. This mixture is concentrated to dryness which yields pure ADN.

EXAMPLE 1

A mixture was made consisting of GUDN (1 g, 4.78 mmole), ammonium-sulfate (0.758 g, 5.74 mmole) and water (10 g). The mixture was heated to about 100° C. while stirring until it was homogenous, in other words about 5 minutes. Thereafter the heat source was removed and 2-propanol (100 ml) was added which produced a precipitate. The precipitate was filtered and washed with 2-propanol (50 ml). The filtrate and the wash fluid were then mixed and concentrated to dryness. The remains from this stage was suspended in 2-propanol (100 ml) and the unsolved particles were filtered off. The filtrate from this stage was concentrated which yielded ADN. The return was 0.470 g (79.2%).

EXAMPLE 2

A mixture was made consisting of GUDN (1 g, 4.78 mmole), ammonium-sulfamate (0.0655 g, 5.74 mmole) and water (10 g). The mixture was heated to about 100° C. while stirring until it was homogenous, in other words about 5 minutes. Thereafter the heat source was removed and 2-propanol (100 ml) was added which produced a precipitate. The precipitate was filtered and washed with 2-propanol (50 ml). The filtrate and the wash fluid were then mixed and concentrated to dryness. The remains from this step was suspended in 2-propanol (100 ml) and the unsolved particles were filtered off. The filtrate from this stage was concentrated which yielded ADN. The return was 0.457 g (76.9%).

EXAMPLE 3

A mixture was made consisting of GUDN (1 g, 4.78 mmole), ammonium-sulfate (0.758 g, 5.74 mmole) and water (10 g). The mixture was heated to about 100° C. while stirring until it was homogenous, in other words about 5 minutes. Thereafter the heat source was removed and 2-propanol (200 ml) was added. Approximately 150 ml of the solvent was removed from the mixture through rotary evaporation under vacuum. The remainder from this concentrating stage was filtered. The precipitate that was filtered off was washed with 2-propanol (50 ml). This wash fluid was mixed with the filtrate. The mixture was concentrated which yielded ADN. The return was 0.327 g (55.1%).

EXAMPLE 4

A mixture was made consisting of GUDN (1 g, 4.78 mmole), ammonium-sulfate (0.758 g, 5.74 mmole), water (5 ml) and 2-butanol (10 ml). The mixture was heated to about 100° C. while stirring until it was homogenous, in other words about 5 minutes. Thereafter the heat source was removed. The solution then separated into an organic phase and a water phase. The organic phase and the water phase were parted. The water phase was extracted using 2-butanol (50 ml), when the solution separated into an organic phase and a water phase. The organic phases from the two separations were combined and concentrated which yields ADN. The return was 0.160 g (26.9%).

EXAMPLE 5

A mixture was made consisting of GUDN (1 g, 4.78 mmole), ammonium-sulfate (0.758 g, 5.74 mmole) and methanol (50 ml). The mixture was backflow-boiled for 2 hours whereafter the heat source was removed. The unsolved particles were filtered away and washed with 2-propanol (50 ml). The filtered off reaction solution was mixed with the wash fluid. This mixture was then concentrated to dryness. The filtrate and the wash fluid were then mixed and concentrated to dryness. The remains from this step was suspended in 2-propanol (100 ml) and the unsolved particles were filtered away. The filtrate was concentrated which yielded pure ADN. The return was 0.145 g (24.4%).

EXAMPLE 6

A column was filled with activated carbon (20 g). The carbon was rinsed with diluted ammonia (5% $NH_3$ aq). A solution was made using GUDN (1.5 g, 7.17 mmole) and $NH_3$ (6 g, 25% aq). The solution was applied on the column, which then was eluated using diluted ammonia (5% $NH_3$ aq). The obtained eluent was then concentrated to dryness which yielded ADN. The return was 0.667 g (75%)

The invention claimed is:

1. Method for producing ammonium dinitramide characterized in that guanylureadinitramide is reacted with an ammonium source in the absence of potassium so that an ion-change takes place and ammonium dinitramide is formed.

2. Method for producing ammonium dinitramide according to claim 1 characterized in that guanylurea dinitramide is reacted with an ammonium source in a solution of water and alcohol.

3. Method for producing ammonium dinitramide according to claim 2 characterized in that the alcohol is methanol.

4. Method for producing ammonium dinitramide according to claim 2 characterized in that the alcohol is ethanol.

5. Method for producing ammonium-dinitramide according to claim 2 characterized in that the alcohol is a propanol.

6. Method for producing ammonium dinitramide according to claim 2 characterized in that the alcohol is a butanol.

7. Method for producing ammonium dinitramide according to claim 2 characterized in that the ammonium source is ammonium-sulfamate.

8. Method for producing ammonium dinitramide according to claim 2 characterized in that the ammonium source is ammonium sulfate.

9. Method for producing ammonium dinitramide according to claim 1 characterized in that the reaction of guanylurea-dinitramide is reacted an ammonium source in a solution of alcohol.

10. Method for producing ammonium dinitramide according to claim 9 characterized in that the ammonium source is ammonium sulfate.

11. Method for producing ammonium dinitramide according to claim 9 characterized in that the ammonium source is ammonium sulfamate.

12. Method for producing ammonium dinitramide according to demand 9 characterized in that the alcohol is methanol.

13. Method for producing ammonium dinitramide according to claim 9 characterized in that the alcohol is ethanol.

14. Method for producing ammonium dinitramide according to claim 9 characterized in that the alcohol is a propanol.

15. Method for producing ammonium dinitramide according to claim 9 characterized in that the alcohol is a butanol.

16. Method for producing ammonium dinitramide according to claim 1 characterized in that the ammonium source is ammonia.

17. Method for producing ammonium-dinitramide according to claim 16 characterized in that ammonium dinitramide is isolated through separation using a carbon column.

* * * * *